(12) United States Patent
Zhou et al.

(10) Patent No.: US 12,272,175 B2
(45) Date of Patent: Apr. 8, 2025

(54) EVALUATING METHOD AND SYSTEM FOR FACE VERIFICATION, AND COMPUTER STORAGE MEDIUM

(71) Applicant: GUANGDONG OPPO MOBILE TELECOMMUNICATIONS CORP., LTD., Guangdong (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 371 days.

(21) Appl. No.: 17/744,548

(22) Filed: May 13, 2022

(65) Prior Publication Data
US 2022/0343681 A1 Oct. 27, 2022

Related U.S. Application Data

(63) Continuation of application No. PCT/CN2020/130070, filed on Nov. 19, 2020.
(Continued)

(51) Int. Cl.
G06V 40/16 (2022.01)
G06V 10/774 (2022.01)
G06V 10/776 (2022.01)

(52) U.S. Cl.
CPC .......... *G06V 40/172* (2022.01); *G06V 10/774* (2022.01); *G06V 10/776* (2022.01); *G06V 40/168* (2022.01)

(58) Field of Classification Search
None
See application file for complete search history.

(56) References Cited

U.S. PATENT DOCUMENTS

| 9,747,494 B2 | 8/2017 | Lo et al. |
| 2006/0093208 A1* | 5/2006 | Li ............... G06F 18/24147 382/190 |

(Continued)

FOREIGN PATENT DOCUMENTS

| CN | 106446754 | 2/2017 |
| CN | 110008842 | 7/2019 |

OTHER PUBLICATIONS

WIPO, International Search Report and Written Opinion for PCT/CN2020/130070, Feb. 20, 2021.

*Primary Examiner* — Jiangeng Sun
(74) *Attorney, Agent, or Firm* — Hodgson Russ LLP

(57) ABSTRACT

An evaluating method and a system for face verification, and a computer storage medium. The method comprises: obtaining a querying dataset and a training dataset, wherein the querying dataset comprises querying images, and the training dataset comprises training images; generating verification pairs and an evaluation list respectively according to the querying dataset and the training dataset; wherein the evaluation list comprises the querying images and the training images; determining feature information based on the evaluation list; establishing correspondences between identifiers and features according to first identifiers of the querying images, second identifiers of the training image, and the feature information; and determining evaluation results of the verification pairs according to the correspondences between the identifiers and the features.

20 Claims, 5 Drawing Sheets

Related U.S. Application Data

(60) Provisional application No. 62/938,250, filed on Nov. 20, 2019.

(56) References Cited

U.S. PATENT DOCUMENTS

| | | | |
|---|---|---|---|
| 2012/0320181 A1* | 12/2012 | Hong | H04N 1/00307 |
| | | | 348/78 |
| 2017/0140212 A1* | 5/2017 | Lo | G06V 40/171 |
| 2020/0285896 A1* | 9/2020 | Huang | G06F 18/21322 |

* cited by examiner

EVALUATING METHOD AND SYSTEM FOR FACE VERIFICATION, AND COMPUTER STORAGE MEDIUM

CROSS REFERENCE TO RELATED APPLICATIONS

This application is a continuation of International Patent Application No. PCT/CN2020/130070, filed Nov. 19, 2020, which claims priority to U.S. Provisional Patent Application No. 62/938,250, filed Nov. 20, 2019, the entire disclosures of which are incorporated herein by reference.

TECHNICAL FIELD

The present disclosure relates to the field of image recognition technology, and more specifically, to an evaluating method and a system for face verification, and a computer storage medium.

BACKGROUND

Regarding the term of face recognition, it is typically defined as either face identification or face verification, which are totally different face recognition processes. In specific, the face identification is a process of using a sample of a to-be-recognized person to compare against multiple samples of different samples. The face verification is a process of using a sample of a to-be-recognized person to compare against multiple other samples of the same person.

As one of the important subjects of the computer visual research, the face verification has been widely used into daily applications such as face unlock on mobile phone, video monitoring, access control system, payment system, and the like. However, when pursuing a high security performance, a scale of a dataset used in the face verification is enlarged greatly. Accordingly, an evaluating process of a large-scale data needs intensive storage cost and computational cost when evaluating the face verification. Therefore, the evaluation of the face verification requires a large amount of calculation and has a low efficiency.

SUMMARY

The present disclosure provides an evaluating method and a system for face verification, and a computer storage medium, so as to improve an efficiency and an accuracy of the face verification.

The technical solution of the present disclosure may be realized as follows.

According to a first aspect, the embodiments of the present disclosure provide an evaluating method of face verification, the method includes:

obtaining a querying dataset and a training dataset, wherein the querying dataset includes querying images, and the training dataset includes training images;

generating verification pairs and an evaluation list respectively according to the querying dataset and the training dataset; wherein the evaluation list includes the querying images and the training images;

determining feature information based on the evaluation list;

establishing correspondences between identifiers and features according to first identifiers of the querying images, second identifiers of the training image, and the feature information; and determining evaluation results of the verification pairs according to the correspondences between the identifiers and the features.

According to a second aspect, the embodiments of the present disclosure provides an evaluating system including an obtaining part, a generating part, a determining part, and an establishing part;

the obtaining part is configured to obtain a query dataset and a training dataset, wherein the querying dataset includes querying images, and the training dataset include training images;

the generating part is configured to generate verification pairs and an evaluation list respectively according to the querying dataset querying dataset and the training dataset; wherein the evaluation list includes the querying images and the training images;

the determining part is configured to determine feature information based on the evaluation list;

the establishing part is configured to establish correspondences between identifiers and features according to first identifiers of the querying images, second identifiers of the training image and the feature information;

the determining part is further configured to determine evaluation results of the verification pairs according to the correspondences between the identifiers and the features.

According to a third aspect, the embodiments of the present disclosure provide an evaluating system, the evaluating system includes a processor and a memory. The memory stores instructions executable by the processor. When the instructions are executed by the processor, the processor performs the evaluating method of the face verification.

According to a fourth aspect, the embodiments of the present disclosure provide a computer storage medium having programs stored therein and applied to the evaluating system. When the programs are executed by the processor, the foregoing evaluating method of face verification is realized.

The embodiments of the present disclosure provide an evaluating method and a system for the face evaluation, and a computer storage medium. The evaluating system is configured to obtain the querying dataset and the training dataset, the querying dataset includes querying images, and the training dataset includes training images. The evaluating system is further configured to generate the verification pairs and the evaluation list according to the querying dataset and the training dataset, and the evaluation list includes the querying images and the training images. Feature information is determined according to the evaluation list. Correspondences between identifiers and features is established according to the first identifiers of the querying images, the second identifiers of the training images, and the feature information. Evaluation results of the verification pairs are determined according to the correspondences between the identifiers and the features. That is, in some embodiments of the present disclosure, the evaluating system may generate the verification pairs and the evaluation list by the obtained querying dataset and the training dataset, and accomplish the evaluating process for the face verification of the verification pairs by using the evaluation list, so as to accomplish the large-scale evaluation for face verification, which reduces a calculation amount, therefore the evaluation efficiency is effectively improved.

DETAILED DESCRIPTION

Figure 1:
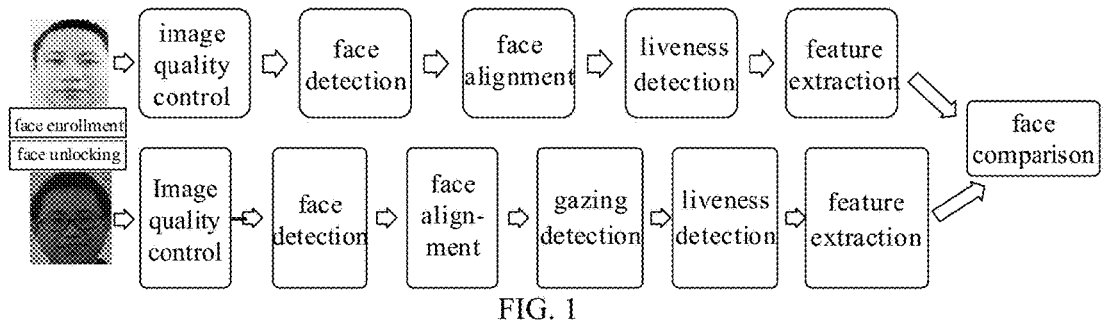
FIG. 1 is a schematic view showing realization of a face unlocking method.

In order to understand features and technical solutions of embodiments of the present disclosure thoroughly, the following illustrates the implementation of the embodiments of the present disclosure accompanying with the drawings. The accompanying drawings are used for reference and illustration only, not used to limit the embodiments of the present disclosure.

Face identification and face verification are the most common terms for face recognition. The face identification and the face verification are totally different face recognition processes.

In specific, the following definitions may be used.

Person: Person (i) is the i-th person among a dataset of persons {Person(0), Person(1), . . . Person(i), . . . Person (n)}.

Sample: Sample (i, j) represents the j-th training image for the i-th person. A sample set for the person (i) may be defined as Sample (i, . . . )={Sample (i, 0), Sample (i, 1), . . . , Sample (i, j), . . . }.

Gallery: an image collection which includes different samples from different persons.

Query: any training image of a person.

Furthermore, the face identification may be a process of using the Query to compare against the Gallery. In some embodiments, the samples stored in the Gallery may be samples from different persons. An output of the face identification is a ranking of at least one person which is highly similar to the person corresponding to the Query.

Accordingly, the face verification may be a process of using the Query to compare against the Gallery. In some embodiments, the gallery may include only different samples from the same person. An output of the face verification is a binary bool value. For example, the output True indicates that the Query and the Gallery belong to the same person, and the output False indicates the Query and the Gallery belong to different persons.

Face verification pair: a face verification pair may be defined as (sample (i, j), {sample (k, . . . )}), wherein sample (i, j) is the sample j of the person i, and the sample (k, . . . ) is multiple samples from the person k.

If person (i) and person (k) are the same person, then the face verification pair may be determined as a positive pair, otherwise the face verification pair may be determined as a negative pair.

In summary, the face identification is greatly different from the face verification. In specific, the face identification may be defined as a problem of one sample from one person against many samples of many persons, that is one-to-many comparison. The face verification may be defined as a problem of one sample from one person against many samples of one person, that is one-to-one comparison. Thus, the face identification may be simplified as one-to-many problem, and the face verification may be simplified as one-to-one problem.

It needs to mentioned that the evaluating method for the face verification according to some embodiments of the present disclosure solves a task of one-to-one verification.

Face unlocking is verification technology of scanning and detecting facial features of a user by using a front camera of a device. If the user cannot be identified by the system, security codes may be required to be input, just like the face identification unlocking technology applied in Android 4.0 system of Google.

Nowadays, face unlocking software is widely used in either IOS system of Apple or Android platform. The face unlocking technology has been applied in many phones as a biometric verification method recently. For example, the noted phones include iphoneX, iphone XS, iphone Max, OPPO FindX. etc. The face unlocking technologies of different phones from such as 1 plus 5T, Iphone X, OPPO FindX are compared in Table 1 in the present disclosure.

TABLE 1

|  | 1 plus 5 T | Iphone X | OPPO FindX |
| --- | --- | --- | --- |
| 2 D/3 D | 2 D | 3 D | 2.5 D |
| Sensor | RGB camera | IR LED + IR structure light | IR LED + IR structure light |
| Security level | Low | High | High (lower than iphone x) |
| Face enrollment | Unknown | Multi-gesture enrollment | Front face enrollment |
| Fingerprint unlocking reserved | Reserved | unreserved | unreserved |
| Unlocking at weak illumination | No | Yes | Yes |
| Unlocking failure notice | Unknown | No | Yes |

TABLE 1-continued

|  | 1 plus 5 T | Iphone X | OPPO FindX |
| --- | --- | --- | --- |
| Unlocking speed | Fast | Fast | Fast (<200 ms) |
| Unlocking experience | Unknown | Resistant to large-posed face, blocking | Resistant to large-posed face, blocking |
| Main technical solution (supposed) | Facial algorithm based on RGB images | Complete 3 D facial algorithm | Facial algorithm mainly based on near infrared, 2 D and 3 D living body detection algorithm |
| Disadvantage analysis | Darkness unlocking, anti-2 D attack, twins recognition | Twins recognition | Close-relative recognition, twins recognition |
| Amount of captured data | Unknown | Unknown (>30 thousand people) | Approximate 30 thousand people |
| Main market | China | Global | China & Europe |
| Issue remained | Many | Twins recognition, advanced 3 d mask attack | Close-relative recognition, twins recognition, advanced 3 d mask attack |

The processes of the face unlocking include a one-time offline face enrollment and an online face identification process. A typical face unlocking process includes face detection, face alignment, gaze detection, liveness detection, face embedding, and face verification. The input used for online face unlocking may include an offline enrolled face database and an online captured query face image. In some embodiments, the offline enrolled face database includes N (normally 1 to 4) face images. The output of the online face unlocking is a binary value, wherein 1 indicates the query face image matches the face database to accept the unlocking; 0 represents the query face image does not match the face database to refuse the unlocking.

FIG. 1 is a schematic view showing the realization of the face unlocking method. As shown in FIG. 1, during the process of the face enrollment, a terminal may control an image quality of a captured image to be enrolled and including a face of the owner of the terminal, and avoid to collect a face image which is too dark, too bright, or includes an unclear or incomplete face. Then in the process of the face detection, through an image processing device, the face of the owner of the terminal is extracted from the image to be enrolled as a standard face image by using the method of some embodiments of the present disclosure. After that, key feature points of the face are automatically positioned or selected from the standard face image through the face alignment process. The key feature points of the face may include an eye, a nose tip, a corner of a mouth, an eyebrow, and contour points of each part of the human face. Liveness detection may be performed on the key feature points of the face to ensure a real person is enrolled and avoid a mask attack. Finally, feature extraction is performed on the key feature points of the face which pass the liveness detection, and the feature extracted is taken as the standard face feature and is pre-stored in the terminal or a server. Regarding the face unlocking, the terminal may execute the foregoing image quality control process in the captured to-be-unlocked image. Then using the image processing device, a target face is extracted from the to-be-unlocked image by the method of the embodiments of the present disclosure in the face detection process, and the face alignment is performed on the target face. Furthermore, sight/gaze detection process is executed according to the key feature point of the target face obtained through the face alignment, to ensure the target person is currently watching the screen. After that, the liveness detection process and the feature extraction process are performed on the key feature of the target face which pass the sight/gaze detection, and finally the target face feature corresponding to the target face is obtained. At last, the image processing device may compare the target face feature to the standard face feature, to determine whether the target face belongs to the owner of the terminal. If the target face belongs to the owner of the terminal, unlocking is performed according to the target face. If the target face does not belong to the owner of the terminal, the face unlocking may be denied or rejected by using the target face, and failure of unlocking is prompted.

Nowadays, the dataset used by the face verification is increasing in pursuit of high security performance. The high security requirement corresponds to an intensive evaluation, so as to solve the problem of having a large amount of calculation and a low efficiency when evaluating the face verification. Besides, the intensive online testing is not feasible for the product.

In order to solve the problem existed in the related art, in some embodiments of the present disclosure, a large-scale dataset is captured, and an offline evaluation is applied on the dataset to comprehensively simulate the intensive online evaluation. The large-scale evaluation includes the testing cases under different scenarios, e.g., indoor/outdoor, darkness, backlight, multiple persons, large-posed faces, masked faces. Thus, the evaluating method for the face verification according to some embodiments of the present disclosure may satisfy higher requirements raised by the fast iteration of each round of evaluation.

In the present disclosure, an offline evaluation framework is proposed for the face verification, to reduce timing cost and make the storage more efficient. In specific, in the embodiments of the present disclosure, an evaluating system may generate verification pairs and an evaluation list by the querying dataset and the training dataset, then the evaluating process is performed on the face verification for the verification pairs using the evaluation list, therefore the evaluating of the face verification of a large-scale dataset may be accomplished, thereby reducing the calculation amount, and effectively improving the evaluating efficiency.

Some embodiments of the present disclosure may be descried in detail in the following.

Figure 2:
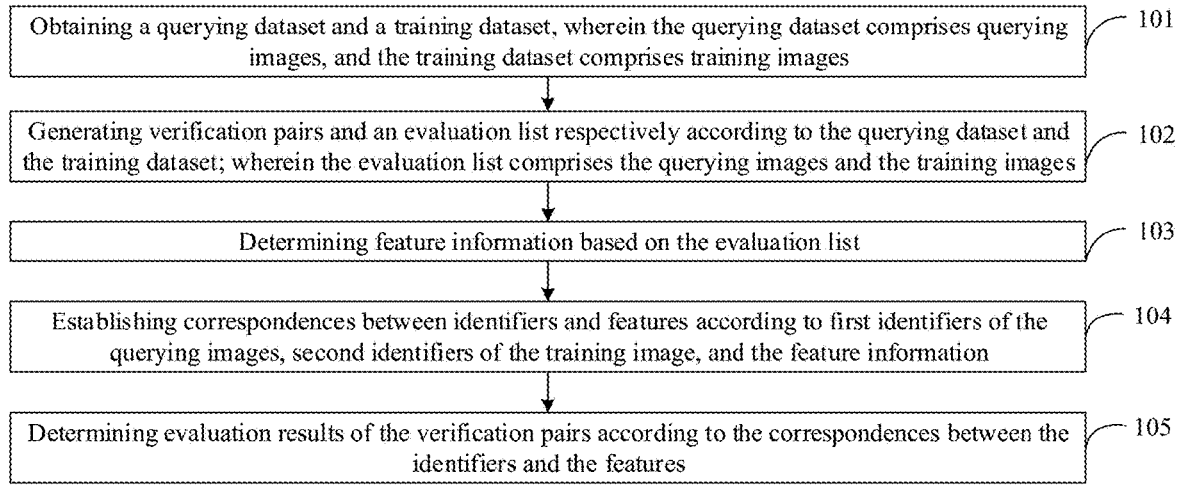
FIG. 2 is a first schematic flowchart of an evaluating method for face verification.

One embodiment of the present disclosure provides an evaluating method for face verification. FIG. 2 is the first schematic flowchart of the evaluating method for face verification. As shown in FIG. 2, in the embodiment of the present disclosure, the evaluating method for the face verification of the evaluating system may include operations executed by the following blocks.

At block 101, a querying dataset and a training dataset may be obtained. The querying dataset includes querying images, and the training dataset includes training images.

In the embodiments of the present disclosure, the evaluating system may firstly obtain the querying dataset and the training dataset.

Specifically, in the embodiment of the present disclosure, the querying dataset includes the querying images, and the training dataset includes the training images.

It may be understood that, in the embodiment of the present disclosure, in the operation of obtaining the querying dataset and the training dataset, the evaluating system may obtain a plurality of images through an infrared camera at first, and the images are all gray-scale images; then the querying dataset Queries and the training dataset Galleries are determined based on the images.

Furthermore, in the embodiment of the present disclosure, the evaluating system may collect or capture images through the infrared camera first, to obtain the plurality of images. In some embodiments, the images captured by the infrared camera are all gray-scale images, that is, each image is a single-channel gray-scale image.

It should be noted that, in some embodiment of the present disclosure, the images captured by the infrared camera are of the same size. For example, each image all has the size of 640 (height)*400 (width).

Furthermore, in some embodiments of the present disclosure, the evaluating system may generate the querying dataset and the training dataset based on the images after obtaining the images.

In specific, in some embodiments of the present disclosure, the evaluating system may divide the plurality of images directly to obtain the querying dataset and the training dataset, i.e., the images in the querying dataset and the images in the training dataset both belong to the plurality of images.

Optionally, in the present disclosure, the evaluating system may extract a part of the plurality of images and combine the part of the plurality of images with another independent image dataset to generate the training dataset. In the mean time, the querying dataset may be generated or formed by the rest of the plurality of images. That is to say, the images of the querying dataset all belong to the foregoing plurality of images, while not all of the images from the training dataset belong to the plurality of images.

Exemplarily, in some embodiment of the present disclosure, the evaluating system may obtain an infrared dataset by the images collected or captured by the infrared camera. The infrared dataset includes 1760000 images from 19773 persons. Then, the evaluating system may randomly split out 270000 images from 3000 for evaluation, and the others are used for training.

Furthermore, the evaluating system may further use another separate dataset with 5,559 persons of 14,204 images. These images may form a part of the training dataset Galleries. As for the infrared dataset, the evaluating system may generate the training dataset (Galleries) in a way of taking 4 images for per person from the 270,000 images (that is, 3000 persons, totally 12000 images). The rest of images corresponding to the 3000 persons are used for querying, that is the querying dataset Queries.

Figure 3:
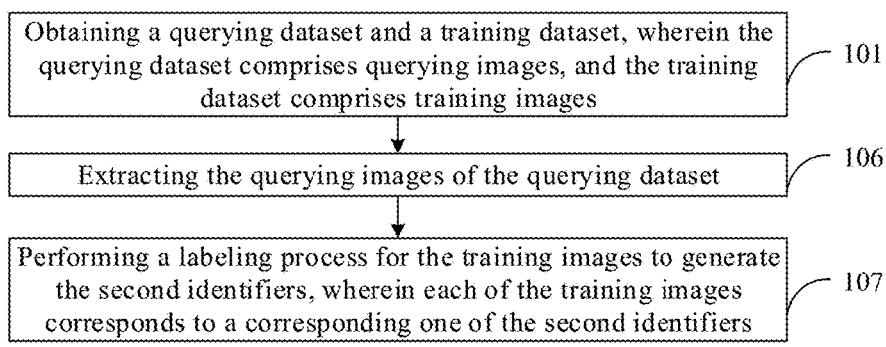
FIG. 3 is a second schematic flowchart of the evaluating method for face verification.

FIG. 3 is the second schematic flowchart of the evaluating method for face verification. As shown in FIG. 3, in some embodiments of the present disclosure, after the obtaining of the querying dataset and the training dataset, that is, after the block 101, the evaluating method for the face verification performed by the evaluating system may include the operations executed by the following blocks.

At block 106, the querying images of the querying dataset may be extracted.

At block 107, a labeling processing for the querying images may be performed in sequence to generate the first identifiers. In some embodiments, each of the querying images corresponds to a corresponding one of the first identifiers.

In some embodiments of the present disclosure, the evaluating system may determine identifier information for all the querying images in the querying dataset after obtaining the querying dataset and the training dataset. In specific, the evaluating system may extract all the querying images of the querying dataset. The evaluating system may perform the labeling process on each of the querying images, to generate the corresponding first identifier. In some embodiments, each of the querying images corresponds to the corresponding one of the first identifiers.

Figure 4:
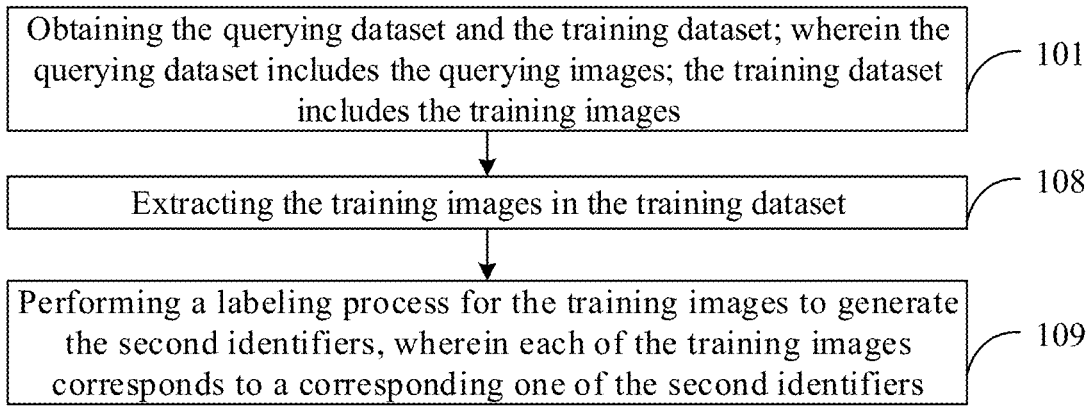
FIG. 4 is a third schematic flowchart of the evaluating method for face verification.

FIG. 4 is a third schematic flowchart of the evaluating method for the face verification. As shown in FIG. 4, in some embodiments of the present disclosure, after the obtaining of the querying dataset and the training dataset, that is, after the block 101, the evaluating method for the face verification performed by the evaluating system may include the operations executed by the following blocks.

At block 108, the training images in the training dataset may be extracted.

At block 109, a labeling process may be performed on the training images to generate the second identifiers. In some embodiments, each of the training images corresponds to a corresponding one of the second identifiers.

In some embodiments of the present disclosure, after obtaining the querying dataset and the training dataset, the evaluating system may further determine the identifier information for all the training images in the training dataset. In specific, the evaluating system may extract all the training images in the training dataset. The evaluating system may perform the labeling process for each of the training images and generate a corresponding second identifier. In some embodiments, each of the training images corresponds to one second identifier.

At block 102, verification pairs and an evaluation list may be generated according to the querying dataset and the training dataset. In some embodiments, the evaluation list includes the querying images and the training images.

In some embodiments of the present disclosure, the evaluating system may generate the verification pair and the evaluation list respectively according to the querying dataset and the training dataset after obtaining the querying dataset and the training dataset.

It needs to be illustrated that, each verification pair may include one querying image and a plurality of training images according to the embodiments of the present disclosure. That is, during the process of generating the verification pairs, the evaluating system may select one querying image from the querying dataset, and meanwhile select the plurality of training images from the training dataset to constitute one verification pair. In some embodiments, all the one querying image and the plurality of training images of each verification pair belong to images of the same person.

That is, according to some embodiments of the present disclosure, in the operation of generating the verification pairs and the evaluation list according to the querying dataset and the training dataset, the evaluating system may pair any one of the querying images in the querying dataset with at least one training image in the training dataset to generate one verification pair.

Exemplarily, in some embodiments of the present disclosure, during the evaluation, there may be 263794 Queries from 3000 persons, and there may be 8559 training data (Galleries) from 8559 persons. In some embodiments, each gallery includes a plurality of images (e.g., 2 to 4 images) from the same person. The evaluating system may form the verification pairs {(Query, Gallery)} by enumerating all the querying data from the querying dataset (Queries) and all the training data in the training dataset (Galleries). For example, for the foregoing 3000 persons, 2.26 billion verification pairs may be generated, including 263994 positive verification pairs.

Furthermore, in some embodiments of the present disclosure, for each verification pair (Query, Gallery), there is always one image used for Query, and 2 to 4 images used for Gallery. In order to acquire the distance between the querying data and the training data, the evaluating system may acquire an average distance of the distances between one querying image Query and all the training images Gallery.

In order to acquire the distance between one querying image (Query) and one training image (Gallery), wherein the (Queries) and (Gallery) are 512 dimensional vectors, a distance formula may be defined as sqrt((Query−Gallery)*(Query−Gallery)) in the present disclosure.

It may be understood that, in the present disclosure, the first querying image and the first training image that constitute the first verification pair are not totally the same as the second querying image and the second training image that constitute the second verification pair.

That is, in some embodiments of the present disclosure, for two different verification pairs, the querying image and the training image which are included in the two different verification pairs are not totally the same.

Furthermore, according to some embodiments of the present disclosure, in the operation of generating the verification pairs and the evaluation list according to the querying dataset and the training dataset, the evaluating system may constitute the evaluation list according to all the querying images in the querying dataset and all the training images in the training dataset. That is, the evaluation list may include all the querying images in the querying dataset, and include all the training images in the training dataset.

That is, in the present disclosure, the evaluating system may use all the images in the querying dataset (Queries) and in the training dataset (Galleries) to constitute the evaluation list.

It may be understood that, any two images in the evaluation list are different from each other in the present disclosure.

Furthermore, in some embodiments of the present disclosure, after generating the verification pairs, the evaluating system may determine memory parameters, then process the verification pairs in batches according to the memory parameters to obtain at least one batch of the verification pairs, and at last, storage the at least one batch of verification pairs in sequence.

In specific, the memory parameters may be performance parameters corresponding to the evaluating system and representing a storage capacity of the evaluating system.

That is, in some embodiments of the present disclosure, after generating the verification pairs, the evaluating system may store the verification pairs in batches according to the corresponding performance parameters.

At block 103, feature information may be determined according to the evaluation list.

In some embodiments of the present disclosure, after generating the evaluation list, the evaluating system may further determine the feature information according to the evaluation list.

It needs to be illustrated that, in some embodiments of the present disclosure, the feature information determined according to the evaluation list may be the feature information corresponding to the face in each image in the evaluation list.

Figure 5:
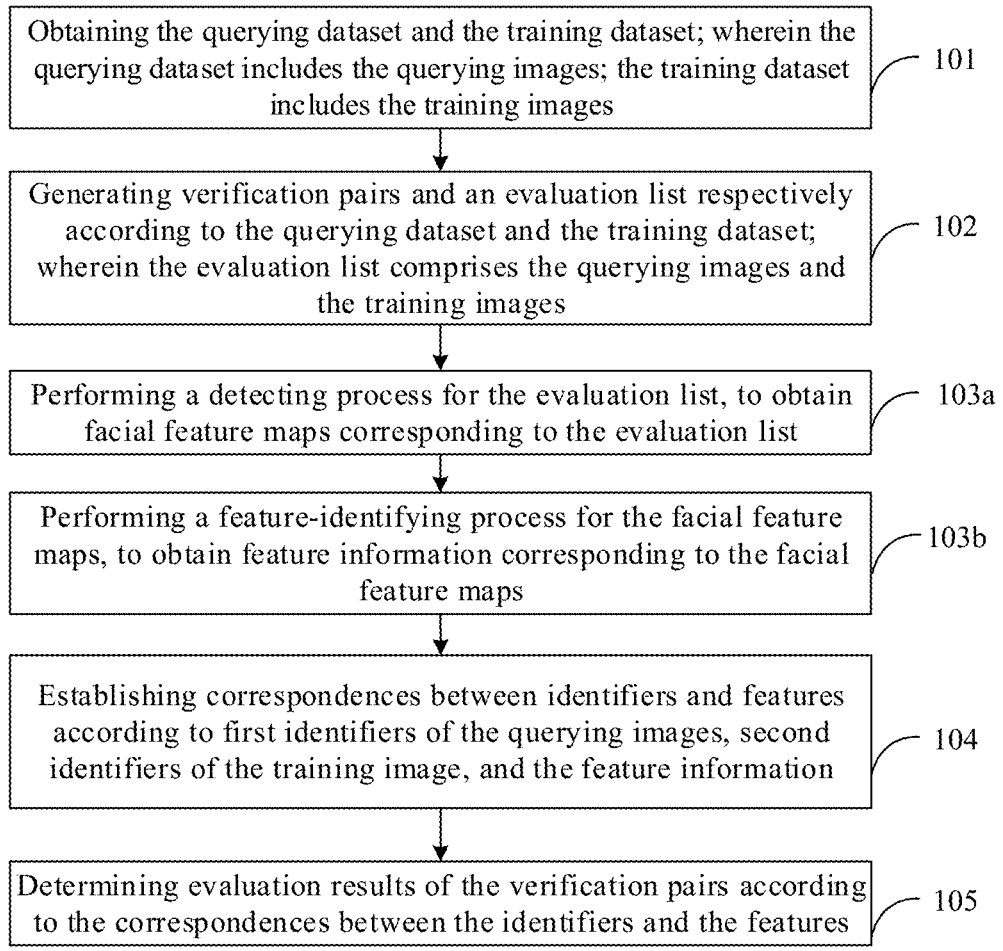
FIG. 5 is a fourth schematic flowchart of the evaluating method for face verification.

Furthermore, in some embodiments of the present disclosure, FIG. 5 is the fourth schematic flowchart of the evaluating method for the face verification. As shown in FIG. 5, the determining the feature information based on the evaluation list by the evaluating system may include operation executed by the following blocks.

At block 103a, a detecting process is performed for the evaluation list, to obtain the facial feature map corresponding to the evaluation list.

In some embodiments of the present disclosure, after the evaluating system generates the evaluation list, the image in the evaluation list may be detected first, to obtain the facial feature maps corresponding to the evaluation list.

Exemplarily, in some embodiments of the present disclosure, in the operation of performing the detecting process for the evaluation list to obtain the facial feature figure map corresponding to the evaluation list, the evaluating system may input all the images in the evaluation list into a preset facial detection model in sequence, and output the facial feature maps. In some embodiments, each image corresponds to a corresponding one of the facial feature maps.

At block 103b, a feature-identifying process is performed for the facial feature maps to obtain the feature information corresponding to the facial feature maps.

In some embodiments of the present disclosure, after the evaluating system performs the detecting process for the images in the evaluation list and obtains the facial feature maps corresponding to the evaluation list, the evaluating system may further perform the feature-identifying process for the facial feature maps, to further obtain the feature information corresponding to the facial feature maps.

Further, in some embodiments of the present disclosure, in the operation of performing the feature-identifying process for the facial feature maps to obtain the feature information corresponding to the facial feature maps, the evaluating system may directly input the facial feature maps into the preset feature recognition model, to output the corresponding feature information. In some embodiments, each of the facial feature maps corresponds to a corresponding group of feature information.

At block 104, correspondences between identifiers and features may be established according to the first identifiers of the querying images, the second identifiers of the training images, and the feature information.

In some embodiments of the present disclosure, after the evaluating system determines the feature information according to the evaluation list, the evaluating system may further establish the correspondences between the identifiers and the features according to the first identifiers of the querying images, the second identifiers of the training image, and the feature information.

It needs to be illustrated that, in some embodiments of the present disclosure, in the operation of establishing the correspondences between the identifiers and the features, the evaluating system may establish correspondences between the identifiers and the feature maps according to the first identifiers, the second identifiers, and the facial feature maps, then establish the correspondences between the identifiers and the features according to the feature information and the correspondences between the identifiers and the feature maps.

It may be understood that, in some embodiments of the present disclosure, after performing the detecting process for the evaluation list to obtain facial feature maps corresponding to the evaluation list, the evaluating system may establish the correspondences between the identifiers and the feature maps based on the first identifiers, the second identifiers, and the facial feature maps.

It needs to be illustrated that, in some embodiments of the present disclosure, after performing the feature-identifying process for the facial feature maps to obtain the feature information corresponding to the facial feature maps, the evaluating system may also establish the correspondences between the identifiers and the features according to the feature information and the correspondences between the generated identifiers and the feature maps.

At block 105, evaluation results of the verification pairs may be determined according to the correspondences between the identifiers and the features.

In some embodiments of the present disclosure, after establishing the correspondences between the identifiers and the features according to the first identifiers of the querying images, the second identifiers of the training image, and the feature information, the evaluating system may further determine the evaluation results corresponding to the verification pairs according to the correspondences between the identifiers and the features.

Further, in some embodiments of the present disclosure, in the operation of determining the evaluation results corresponding to the verification pairs according to the correspondences between the identifiers and the features, the evaluating system may firstly perform a face verification processing for the verification pairs using the correspondences between the identifiers and the features to generate face-verification results, then perform an evaluating processing for the face-verification results, and finally obtain the evaluation results corresponding to the verification pairs.

It may be understood that, in some embodiments of the present disclosure, the evaluation results are configured to determine an accuracy of the face verification.

Further, in some embodiments of the present disclosure, the correspondences between the identifiers and the features may be used for the verifying process based on the facial features. In specific, in the operation of performing the face verifying process for the verification pairs according to the correspondences between the identifiers and the features to generate the face-verification results, the evaluating system may firstly determine a first target identifier and a second target identifier corresponding to a verification pair, then determine first feature information according to the first target identifier and the correspondences between the identifiers and the features, meanwhile determine second feature information according to the second target identifier and the correspondences between the identifiers and the features, and finally generate generating the face-verification result based on the first feature information and the second feature information.

It needs to be indicated that in the present disclosure, the first target identifier may be the identification information corresponding to the querying image in the verification pairs, and the second target identifier may be the identification information corresponding to the training image in the verification pairs.

Accordingly, in the present disclosure, the first feature information determined by the first target identifier and the correspondences between the identifiers and the features is the feature information corresponding to the querying image in the verification pairs, and the second feature information determined by the second target identifier and the correspondences between the identifiers and the features is the feature information corresponding to the training image in the verification pairs.

Furthermore, in some embodiments of the present disclosure, in the operation of generating the face-verification result based on the first feature information and the second feature information, the evaluating system may choose to directly compare the first feature information with the second feature information. In response to the first feature information being same to the second feature information, it can be determined that the face-verification result is pass. In response to the first feature information being different from the second feature information, it can be determined that the face-verification result is failure.

That is, in the present disclosure, the evaluating system may pass the face verification only in response to the first feature information and the second feature information corresponding to the verification pair are the same.

Further, in some embodiments of the present disclosure, in the operation of generating the face-verification result based on the first feature information and the second feature information, the evaluating system may choose to firstly calculate a similarity between the first feature information and the second feature information. In response to the similarity being larger than or equal to a preset similarity threshold, it may be determined that the face-verification result is pass. In response to the similarity being less than the preset similarity threshold, it may be determined that the face-verification result is failure.

That is, in the present disclosure, the evaluating system may pass the face verification as long as the similarity between the first feature information and the second feature information corresponding to the verification pairs are greater than a certain degree, that is greater than the similarity threshold.

Further, in some embodiments of the present disclosure, after the performing the face verifying process for the verification pairs according to the correspondences between the identifiers and the features to generate the face-verification results, the evaluating system may perform the evaluating process for the face-verification results. That is, the accuracy of the face verification process is evaluated based on the face-verification results of the verification pairs.

In specific, in some embodiments of the present disclosure, in the operation of performing the evaluating process for the face-verification results to obtain the evaluation results, the evaluating system may first obtain an original verification result corresponding to the verification pair, then performs the evaluating process for a face-verification result of the verification pair according to the original verification result thereof, finally obtain the evaluation result corresponding to the verification pair.

That is, in some embodiments of the present disclosure, after finishing the face verification for the verification pairs, the evaluating system may evaluate the accuracy of the face verification. In specific, the evaluating system may use truths corresponding to the verification pairs to evaluate the verifying results. In some embodiments, the truths of the verification pairs are the original verification results of the verification pairs.

It needs to be illustrated that, in some embodiments of the present disclosure, the original verification results may be configured to determine whether the querying images and the training images in the verification pairs are the images belong to the same person. That is, it may be regarded that the original verification result is accurate relative to the face verifying result which may have an error. Therefore, the original verification result may be used for the evaluating processing.

Exemplarily, in some embodiments of the present disclosure, the evaluation results determined by the evaluating system may include a true positive rate and a false positive rate. In some embodiments, the true positive rate is represented by TPR, the false positive rate is represented by FPR.

Further, in the present disclosure, the true positive rate and the false positive rate may be used to evaluate the performance of the face verification. For the TPR, the performance is better when the value is larger. For FPR, the performance is better when the value is smaller. In some embodiments, the TPR and the FPR may be defined by the below formulas.

$$TPR=TP/(TP+FN) \quad (1)$$

$$FPR=FP/(FP+TN) \quad (2)$$

Wherein TP may be defined as a prediction for the face unlocking is true (belong to the same person), a ground truth for the face unlocking is true, i.e., TP represents that the face-verification result is pass, and the original verification result is pass. FP may be defined as a prediction for the face unlocking is true (belong to the same person), and the ground truth for the face unlocking is false (not belong to the same person), i.e., FP represents that the face-verification result is pass, and the original verification result is failure. TN may be defined as a prediction of the face unlocking is false, and the ground truth for the face unlocking is false, i.e., TN represents the face-verification result is not pass, and the original verification result is failure. FN may be defined as a prediction for the face unlocking is false, and the ground truth for the face unlocking is true, i.e., FN represents that the face-verification result is failure, but the original verification result is pass.

In conclusion, in some embodiments of the present disclosure, by the evaluating method for the face verification as disclosed in the block 101 to the block 111, the evaluating system may perform the face verification through one offline evaluation framework. In specific, the evaluating system may use the obtained querying dataset and the training dataset to generate the verification pairs and the evaluation list, so as to perform evaluating process on the face-verification result after performing the face verification on the verification pairs by using the feature information generated based on the evaluation list, to obtain the final evaluation result.

It needs to be illustrated that, in some embodiments of the present disclosure, the present disclosure is used to evaluate the face verification performance in the face unlocking system. In some embodiments, the querying dataset and the training dataset are obtained through the infrared camera, and the evaluating method of using the generation of the evaluation list to further evaluate the face verification is unique.

The embodiments of the present disclosure provide an evaluating method for the face verification, the evaluating system is configured to obtain the querying dataset and the training dataset, the querying dataset includes querying images, and the training dataset includes training images.

The evaluating system is further configured to generate the verification pairs and the evaluation list according to the querying dataset and the training dataset, and the evaluation list includes the querying images and the training images. Feature information is determined according to the evaluation list. Correspondences between identifiers and features is established according to the first identifiers of the querying images, the second identifiers of the training images, and the feature information. Evaluation results of the verification pairs are determined according to the correspondences between the identifiers and the features. That is, in some embodiments of the present disclosure, the evaluating system may generate the verification pairs and the evaluation list by the obtained querying dataset and the training dataset, and accomplish the evaluating process for the face verification of the verification pairs by using the evaluation list, so as to accomplish the large-scale evaluation for face verification, which reduces a calculation amount, therefore the evaluation efficiency is effectively improved.

Figure 6:
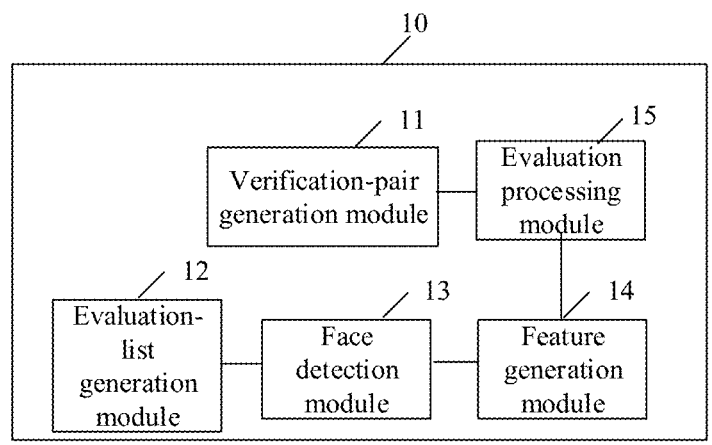
FIG. 6 is a schematic block diagram of a realization framework of the evaluating method.

Based on the foregoing embodiments, in the other embodiment of the present disclosure, FIG. 6 is a schematic block diagram of a realization framework of the evaluating method. As shown in FIG. 6, in executing the evaluating process for face evaluation, the evaluating system 10 includes a verifying-pair generation module 11, an evaluating-list generation module 12, a face detection module 13, a feature generation module 14, and an evaluation processing module 15.

Further, in some embodiments of the present disclosure, the verifying-pair generation module 11 may be configured to determine verification pairs according to the querying dataset (Queries) and the training dataset (Galleries).

Accordingly, in the present disclosure, the evaluating-list generation module 12 may be configured to determine the evaluation list according to the querying dataset (Queries) and the training dataset (Galleries).

It needs to be illustrated that, in some embodiments of the present disclosure, the querying dataset (Queries) and the training dataset (Galleries) are obtained by the evaluating system through the infrared camera. In specific, the evaluating system may collect images through the infrared camera first to obtain a plurality of images. The plurality of images captured by the infrared camera are all grey-scale images. That is, each image is a single-channel grey-scale image, and a pixel value of each image maps to 0 to 255.

Further, in some embodiments of the present disclosure, in the process of generating the querying dataset and the training dataset according to the plurality of images captured by the infrared camera, the evaluating system may choose to divide the plurality of images directly, to obtain the querying dataset and the training dataset. In some embodiments, the evaluating system may also extract a part of the plurality of images and combine the part of the plurality of images with another independent image dataset to generate the training dataset, and meanwhile generate the querying dataset by the rest of the plurality of images.

Exemplarily, in some embodiment of the present disclosure, the evaluating system may obtain an infrared dataset by the images collected or captured by the infrared camera. The infrared dataset includes 1760000 images from 19773 persons. Then, the evaluating system may randomly split out 270000 images from 3000 for evaluation, and the others are used for training.

Furthermore, the evaluating system may further use another separate dataset with 5,559 persons of 14,204 images. These images may form a part of the training dataset Galleries. As for the infrared dataset, the evaluating system may generate the training dataset (Galleries) in a way of taking 4 images for per person from the 270,000 images (that is, 3000 persons, totally 12000 images). The rest of images corresponding to the 3000 persons are used for querying, that is the querying dataset Queries.

It needs to be illustrated that, in some embodiments of the present disclosure, each verification pair may include one querying image and a plurality of training images. In specific, during the process of generating the verification pairs, the verifying-pair generation module 11 may select one querying image from the querying dataset, and meanwhile select the plurality of training images from the training dataset to constitute one verification pair. In some embodiments, all the one querying image and the plurality of training images of each verification pair belong to images of the same person.

That is, in some embodiments of the present disclosure, in the process of generating the verification pairs and the evaluation list according to the querying dataset and the training dataset, the verifying-pair generation module 11 may pair any one of the querying image in the querying dataset with at least one training image in the training dataset to generate one verification pair.

Further, in some embodiments of the present disclosure, during the evaluation, there may be 263794 Queries from 3000 persons, and there may be 8559 training data (Galleries) from 8559 persons. In some embodiments, each gallery includes a plurality of images (e.g., 2 to 4 images) from the same person. The evaluating system may form the verification pairs {(Query, Gallery)} by enumerating all the querying data from the querying dataset (Queries) and all the training data in the training dataset (Galleries). For example, for the foregoing 3000 persons, 2.26 billion verification pairs may be generated, including 263994 positive verification pairs.

Further, in some embodiments of the present disclosure, for each verification pair (Query, Gallery), there is always one image used for Query, and 2 to 4 images used for Gallery. In order to acquire the distance between the querying data and the training data, the evaluating system may acquire an average distance of the distances between one querying image Query and all the training images Gallery.

In order to acquire the distance between one querying image (Query) and one training image (Gallery), wherein the (Queries) and (Gallery) are 512 dimensional vectors, a distance formula may be defined as sqrt((Query−Gallery)*(Query−Gallery)) in the present disclosure.

Further, in some embodiments of the present disclosure, in the process of generating the verification pairs and the evaluation list according to the querying dataset and the training dataset, the evaluating-list generation module 12 may constitute the evaluation list according to all the querying images in the querying dataset and all the training images in the training dataset. That is, the evaluation list may include all the querying images in the querying dataset, and include all the training images in the training dataset.

That is, in some embodiments of the present disclosure, the evaluating-list generation module 12 may use all the images in the querying dataset (Queries) and in the training dataset (Galleries) to constitute the evaluation list.

It may be understood that, in the present disclosure, any two images in the evaluation list are different from each other.

Further, in some embodiments of the present disclosure, after generating the verification pairs, the evaluating system may determine memory parameters, then process the verification pairs in batches according to the memory parameters to obtain at least one batch of the verification pairs, and at last, storage the at least one batch of verification pairs in sequence.

In specific, the memory parameters may be performance parameters corresponding to the evaluating system and representing a storage capacity of the evaluating system.

That is, in some embodiments of the present disclosure, after generating the verification pairs, the evaluating system may store the verification pairs in batches according to the corresponding performance parameters.

Further, in some embodiments of the present disclosure, the face detection module 13 may be configured to generate a face detection result. In specific, in the present disclosure, the face detection module 13 may perform the detecting process based on the evaluation list, therefore facial feature maps corresponding to the evaluation list is obtained.

In specific, in some embodiments of the present disclosure, the face detection module 13 may input all the images in the evaluation list into the preset facial detection model in sequence, to output the facial feature map. In some embodiments, each image corresponds to a corresponding one of the facial feature maps.

Further, in some embodiments of the present disclosure, the feature generation module 14 may be configured to obtain the feature information. In some embodiments, the feature generation module 14 may perform the feature-identifying process for the facial feature maps, so as to obtain the feature information corresponding to the facial feature maps.

It could be understood that in the present disclosure, the feature information may be the feature information corresponding to the face in each image in the evaluation list.

In specific, in some embodiments of the present disclosure, the feature generation module 14 may directly input the facial feature maps into the preset feature recognition model, to output the corresponding feature information. In some embodiments, each of the facial feature maps corresponds to a corresponding group of feature information.

Exemplarily, in the present disclosure, the feature generation module 14 may generate 512 dimensional vectors for each facial feature map for embedding.

It could be understood that in some embodiments of the present disclosure, after determining the feature information according to the evaluation list, the feature generation module 14 may further establish the correspondences between the identifiers and the features according to the first identifiers of the querying images, the second identifiers of the training image, and the feature information.

Further, in some embodiments of the present disclosure, the evaluation processing module 15 may perform an evaluating processing for the face-verification results, and finally generate the evaluation results corresponding to the verification pairs.

It needs to be illustrated that, in some embodiments of the present disclosure, the evaluation processing module 15 may determine the evaluation results corresponding to the verification pairs according to the correspondences between the identifiers and the features. The evaluation results are configured to determine an accuracy of the face verification.

In specific, in the present disclosure, the evaluation processing module 15 may firstly perform a face verification processing for the verification pairs using the correspondences between the identifiers and the features to generate face-verification results, then perform an evaluating processing for the face-verification results, and finally obtain the evaluation results corresponding to the verification pairs.

Further, in some embodiments of the present disclosure, the correspondences between the identifiers and the features may be used for the verifying process based on the facial features. In specific, in the process of performing the face verifying process for the verification pairs according to the correspondences between the identifiers and the features to generate the face-verification results, the evaluation processing module 15 may firstly determine a first target identifier and a second target identifier corresponding to a verification pair, then determine first feature information according to the first target identifier and the correspondences between the identifiers and the features, meanwhile determine second feature information according to the second target identifier and the correspondences between the identifiers and the features, and finally generate generating the face-verification result based on the first feature information and the second feature information.

It needs to be indicated that in the present disclosure, the first target identifier may be the identification information corresponding to the querying image in the verification pairs, and the second target identifier may be the identification information corresponding to the training image in the verification pairs.

Exemplarily, in the present disclosure, the evaluation processing module 15 may pass the face verification only in response to the first feature information and the second feature information corresponding to the verification pair are the same.

Exemplarily, in the present disclosure, the evaluation processing module 15 may pass the face verification as long as the similarity between the first feature information and the second feature information corresponding to the verification pairs are greater than a certain degree, that is greater than the similarity threshold.

Further, in some embodiments of the present disclosure, after the performing the face verifying process for the verification pairs according to the correspondences between the identifiers and the features to generate the face-verification results, the evaluation processing module 15 may perform the evaluating process for the face-verification results. That is, the accuracy of the face verification process is evaluated based on the face-verification results of the verification pairs.

In specific, in some embodiments of the present disclosure, the evaluation processing module 15 may first obtain an original verification result corresponding to the verification pair, then performs the evaluating process for a face-verification result of the verification pair according to the original verification result thereof, finally obtain the evaluation result corresponding to the verification pair.

That is, in some embodiments of the present disclosure, the evaluation processing module 15 may use truths corresponding to the verification pairs to evaluate the verifying results. In some embodiments, the truths of the verification pairs are the original verification results of the verification pairs.

It needs to be illustrated that, in some embodiments of the present disclosure, the original verification results may be configured to determine whether the querying images and the training images in the verification pairs are the images belong to the same person. That is, it may be regarded that the original verification result is accurate relative to the face verifying result which may have an error. Therefore, the original verification result may be used for the evaluating processing.

Exemplarily, in the present disclosure, the evaluation results determined by the evaluation processing module 15 may include the true positive rate TPR and the false positive rate FPR.

Further, in the present disclosure, the true positive rate and the false positive rate may be used to evaluate the performance of the face verification. For the TPR, the performance is better when the value is larger. For FPR, the performance is better when the value is smaller.

It needs to be understood that, in some embodiments of the present disclosure, it may be known from the foregoing formula (1) that the true positive rate TPR may represent a passing rate of the face-verification results when the querying images and the training images in the verification pairs belong to the same person.

That is, in the present disclosure, the true positive rate TPR is an accurate passing rate of the face-verification result.

It may be understood that, in some embodiments of the present disclosure, it may be known from the formula (2) that the false positive rate FPR may represent the rate of failure of the face-verification result when the querying images and the training images in the verification pairs don't belong to the same person.

That is, in the present disclosure, the false positive rate FPR is the accurate rate of the failure of the face-verification result.

Figure 7:
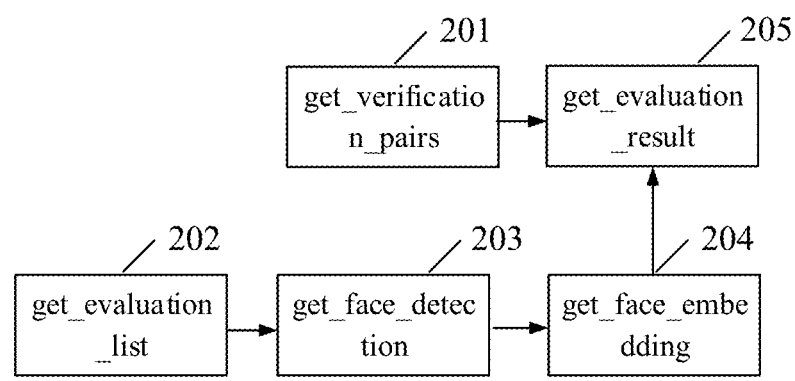
FIG. 7 is a fifth schematic flowchart of the evaluating method for face verification.

FIG. 7 is a fifth schematic flowchart of the evaluating method for face verification. As shown in FIG. 7, when the evaluating system performs the evaluating processing for the face verification, the following operations may be executed: generation of the verification pairs get_verification_pairs (block 201), generation of the evaluation list get_evaluation_list (block 202), detection of the face get_face_detection (block 203), generation of feature information get_face_embedding (block 204), and get_evaluation_result (block 205).

Further, in some embodiments of the present disclosure, the evaluating system may apply the evaluation method for the face verification disclosed by the present disclosure to the large-scale calculation by minimizing the real calculation cost, increasing the memory efficiency, and speeding up the current calculation.

It needs to be understood that in the present disclosure, the evaluating system may minimize the actual calculation cost through removing calculations of duplicated images. For example, there are 2.26 billion verification pairs, and two images (get_face_detection, get_face_embedding) in each verification pair are calculated. However, among all used images, lots of images are repetitive. Therefore, the evaluating system may use operation get_evaluation_list to summarize a list with all used images.

It needs to be illustrated that in some embodiments of the present disclosure, the evaluating system may use the memory mapping file to efficiently save the verification pairs, transform each image name in the verification pair to a unique integer identifier number (e.g. the first identifier, the second identifier) to further save the physical space. The memory mapping file groups all the images to a block file. Whenever the images are loaded into the memory, neighborhood images are continuous in the disk space, therefore loading from the disk to the memory is quicker.

It may be understood that, in some embodiments of the present disclosure, in the operation get_evaluation_result, the evaluating system may adopt batch calculation, due to memory (for example, a central processing unit (CPU) and a graphics processing unit (GPU)) constraints. The batch calculation only loads a batch of the verification pair (e.g.

8192 verification pairs) for calculation, and the final verifying result may be obtained by aggregating from each batch.

Further, in some embodiments of the present disclosure, it's not feasible for the evaluating system to directly load more than 100 G of the verification pairs from the disk to the CPU memory. The batch loading is only configured to load T verification pairs into the CPU memory. T is determined by the capacity of CPU memory, thereby realizing the batch loading mechanism by using the memory mapping file.

Accordingly, in some embodiments of the present disclosure, it's not feasible for the evaluating system to directly load more than 100 G of the verification pairs from the CPU memory into the GPU memory. The batch loading is only configured to load S verification pairs into the GPU memory. S is determined by the capacity of GPU memory. For example, the evaluating system may execute 8192 groups of verification pairs.

Further, in some embodiments of the present disclosure, during the calculation of the get_evaluation_result operation, the evaluating system may evenly divide N verification pairs into 8 pieces, and assign each piece of calculation to different processors (CPU/GPU) for parallel calculation.

Accordingly, in some embodiments of the present disclosure, for the calculation of each piece, the evaluating system may use GPU to further calculate in parallel. The evaluating system may establish a static calculation graph to use the GPU.

Figure 8:
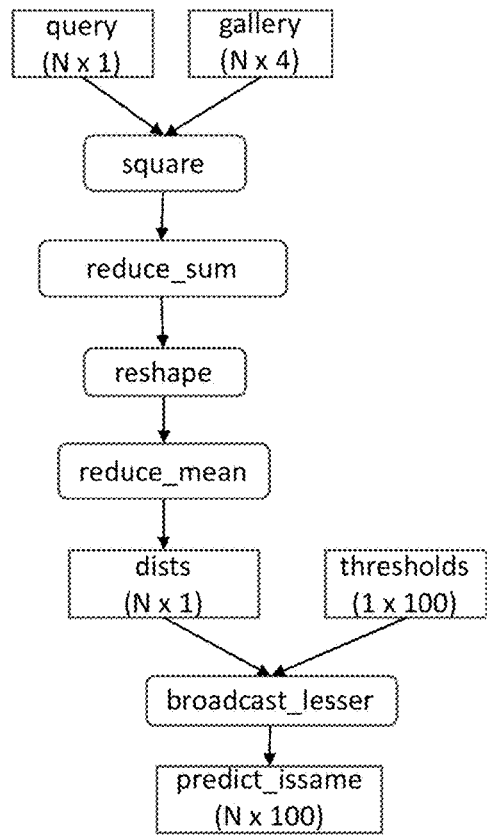
FIG. 8 is a first schematic view of a static calculation.
Figure 9:
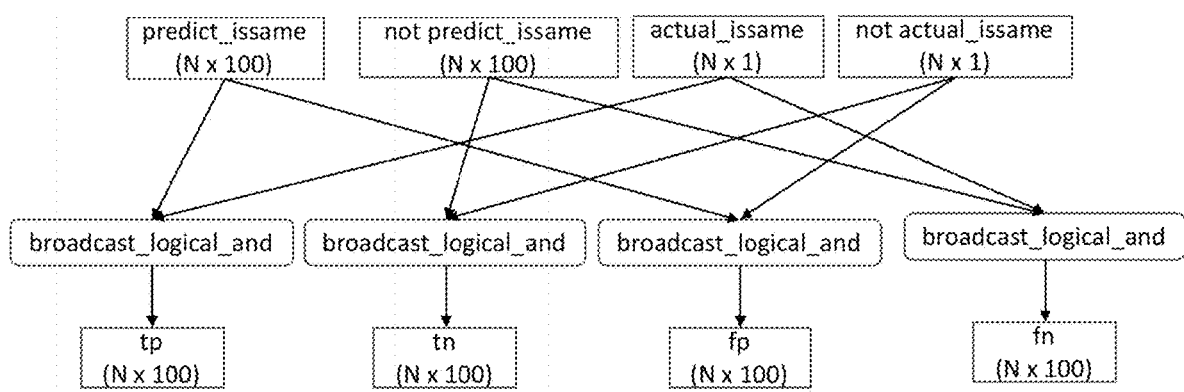
FIG. 9 is a second schematic view of the static calculation.

FIG. 8 is a first schematic view of the static calculation, and FIG. 9 is a second schematic view of the static calculation. As shown in FIGS. 8 and 9, one verification pair include one querying image (Query) and 4 training images (Gallery). The evaluating system realize the above by using the MXNet deep learning framework.

The embodiments of the present disclosure provide an evaluating method for the face verification, the evaluating system is configured to obtain the querying dataset and the training dataset, the querying dataset includes querying images, and the training dataset includes training images. The evaluating system is further configured to generate the verification pairs and the evaluation list according to the querying dataset and the training dataset, and the evaluation list includes the querying images and the training images. Feature information is determined according to the evaluation list. Correspondences between identifiers and features is established according to the first identifiers of the querying images, the second identifiers of the training images, and the feature information. Evaluation results of the verification pairs are determined according to the correspondences between the identifiers and the features. That is, in some embodiments of the present disclosure, the evaluating system may generate the verification pairs and the evaluation list by the obtained querying dataset and the training dataset, and accomplish the evaluating process for the face verification of the verification pairs by using the evaluation list, so as to accomplish the large-scale evaluation for face verification, which reduces a calculation amount, therefore the evaluation efficiency is effectively improved.

Figure 10:
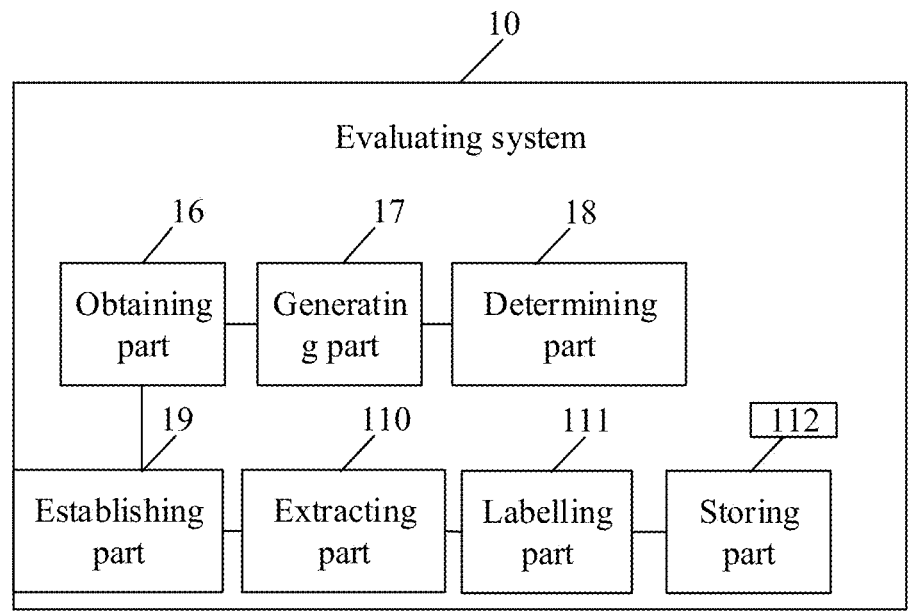
FIG. 10 is a first schematic view of a configuration framework of an evaluating system according to some embodiments of the present disclosure.

Based on the foregoing embodiments, in other embodiments of the present disclosure, FIG. 10 is a first schematic view of a configuration framework of an evaluating system according to some embodiments of the present disclosure. As shown in FIG. 10, the evaluating system 10 in some embodiments of the present disclosure may include an obtaining part 16, a generating part 17, a determining part 18, an establishing part 19, an extracting part 110, a labelling part 111, and a storing part 112.

The obtaining part 16 is configured to obtain the querying dataset and the training dataset. The querying dataset includes the querying images, and the training dataset includes the training images.

The generating part 17 is configured to generate the verification pairs and the evaluation list according to the querying dataset and the training dataset. The evaluation list includes the querying images and the training images.

The determining part 18 is configured to determine the feature information according to the evaluation list.

The establishing part 19 is configured to establish the correspondences between the identifiers and the features according to the first identifiers of the querying images, the second identifiers of the training image, and the feature information.

The determining part 18 is further configured to determine the evaluation results of the verification pairs according to the correspondences between the identifiers and the features.

Further, in some embodiments of the present disclosure, the extracting part 110 is configured to extract all the querying images in the querying dataset after the querying dataset and the training dataset are obtained.

The labelling part 111 is configured to perform a labeling process for the querying images in sequence to generate the first identifiers. Each of the querying images corresponds to a corresponding one of the first identifiers.

Further, in some embodiments of the present disclosure, the extracting part 110 is further configured to extract the training images in the training dataset.

The labelling part 111 is further configured to perform a labeling process for the training images to generate the second identifiers. Each of the training images corresponds to a corresponding one of the second identifiers.

Further, in some embodiments of the present disclosure, the generating part 17 is specifically configured to pair each of the querying image of the querying dataset with at least one of the training images of the training dataset, to generate a verification pair.

Further, in some embodiments of the present disclosure, a first querying image and a first training image that constitute a first verification pair are not totally same to a second querying image and a second training image that constitute a second verification pair.

Further, in some embodiments of the present disclosure, the generating part 17 is specifically configured to constitute the evaluation list according to all of the querying images of the querying dataset and all of the training images of the training dataset.

Further, in some embodiments of the present disclosure, any two images in the evaluation list are different from each other.

Further, in some embodiments of the present disclosure, the determining part 18 is specifically configured to perform a detecting process for the evaluation list, to obtain facial feature maps corresponding to the evaluation list, and perform a feature-identifying process for the facial feature maps, to obtain feature information corresponding to the facial feature maps.

Further, in some embodiments of the present disclosure, the determining part 18 is specifically configured to input all the images in the evaluation list into a preset face detection model in sequence, and outputting the facial feature maps. Each of the images corresponds to a corresponding one of the facial feature maps.

Further, in some embodiments of the present disclosure, the determining part 18 is specifically further configured to input the facial feature maps to a preset feature recognition model, and outputting the feature information. Each of the facial feature maps corresponds to a corresponding group of feature information.

Further, in some embodiments of the present disclosure, the establishing part 19 is specifically further configured to establish the correspondences between the identifiers and the feature maps based on the first identifiers, the second identifier, and the facial feature map, and establish the correspondences between the identifiers and the features according to the correspondences between the identifiers and the feature maps, and the feature information.

Further, in some embodiments of the present disclosure, the determining part 18 is specifically further configured to perform a face verifying process for the verification pairs according to the correspondences between the identifiers and the features, to generate face-verification results, and perform an evaluating process for the face-verification results, to obtain the evaluation results.

Further, in some embodiments of the present disclosure, the determining part 18 is specifically further configured to determine a first target identifier and the second target identifier corresponding to a verification pair; determine first feature information according to the first target identifier and the correspondences between the identifiers and the features; determine second feature information according to the second target identifier and the correspondences between the identifiers and the features; and generate a face-verification result based on the first feature information and the second feature information.

Further, in some embodiments of the present disclosure, the determining part 18 is specifically further configured to determine the face-verification result is pass in response to the first feature information being same to the second feature information, and determine the face-verification result is failure in response to the first feature information being different from the second feature information.

Further, in some embodiments of the present disclosure, the determining part 18, is specifically further configured to calculate a similarity between the first feature information and the second feature information; determine the face-verification result is pass in response to the similarity being larger than or equal to a preset similarity threshold; and determine the face-verification result is failure in response to the similarity being less than the preset similarity threshold.

Further, in some embodiments of the present disclosure, the determining part 18, is specifically further configured to obtain an original verification result corresponding to a verification pair, and perform the evaluating process for a face-verification result of the verification pair according to the original verification result thereof, to obtain an evaluation result thereof.

Further, in some embodiments of the present disclosure, the determining part 18 is specifically further configured to determine the memory parameters.

The obtaining part 16 is further configured to process the verification pairs in batches according to the memory parameters, to obtain at least one batch of the verification pairs.

The storing part 112 is configured to store the at least one batch of the verification pairs in sequence.

Further, in some embodiments of the present disclosure, the obtaining part 16 is specifically configured to obtain a plurality of images by an infrared camera, and the images are all gray-scale images; and determine the querying dataset and the training dataset according to the plurality of images.

Figure 11:
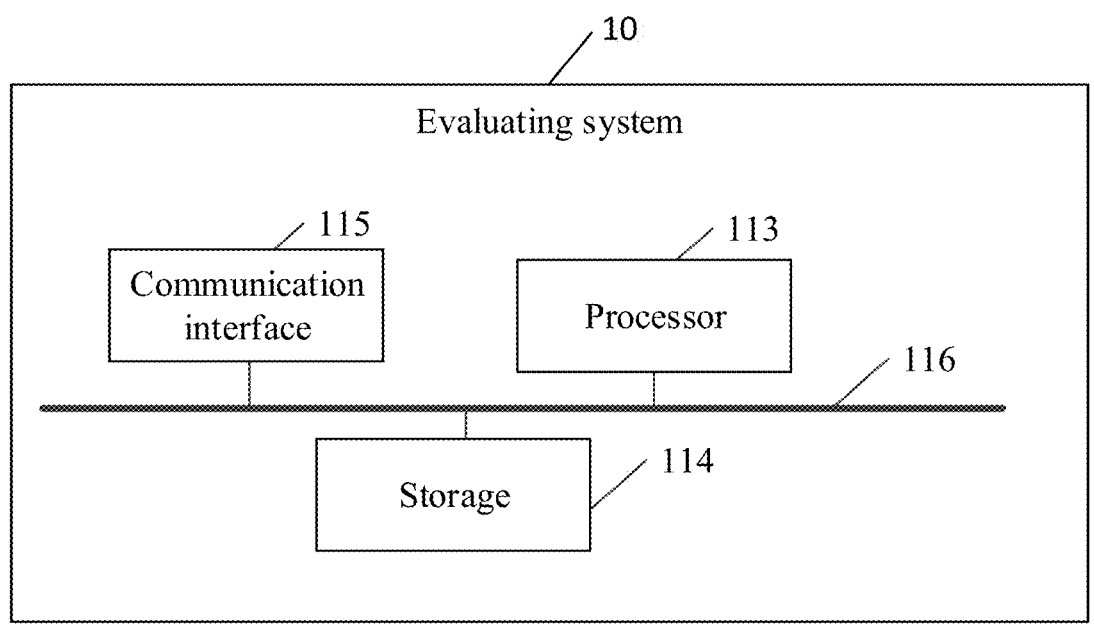
FIG. 11 is a second schematic view of the configuration framework of the evaluating system according to some embodiments of the present disclosure.

In some embodiments of the present disclosure, further, FIG. 11 is a second schematic view of the composition structure of the evaluating system according to some embodiments of the present disclosure. As shown in FIG. 11, the evaluating system 10 in some embodiments of the present disclosure may further include a processor 113, a storage 114 storing instructions executable by the processor 113. Further, the evaluating system 10 may include a communication interface 115, a bus 116 connected to the processor 113, the storage 114, and the communication interface 115.

In some embodiments of the present disclosure, the foregoing processor 113 may be at least one of an application specific integrated circuit (ASIC), a digital signal processor (DSP), a digital signal processing device (DSPD), a programmable logic device (PLD), a field programmable gate array (FPGA), the central processing unit (CPU), a controller, a microcontroller, and a microprocessor. It may be understood that for different devices, the electronic device configured to realize the functions of the processor may be implemented in other ways, which will not be specifically limited in the embodiments of the present disclosure. The evaluating system 10 may further include the storage 114, and the storage 114 may be connected to the processor 113. The storage 114 is configured to store executable program codes, and the program codes include computer operation instructions. The storage 114 may include high-speed random-access memory (RAM), or may further include non-volatile storages, for example, at least two disk storage.

In some embodiments of the present disclosure, the bus 116 is configured to connect the communication interface 115, the processor 113, and the storage 114, and ensure the communication among these devices.

In some embodiments of the present disclosure, the storage 114 is configured to store instructions and data.

Further, in some embodiments of the present disclosure, the processor 113 is configured to obtain a querying dataset and a training dataset, and the querying dataset includes querying images, and the training dataset includes training images; generate verification pairs and an evaluation list respectively according to the querying dataset and the training dataset, and the evaluation list includes the querying images and the training images; determine feature information based on the evaluation list; establish correspondences between identifiers and features according to first identifiers of the querying images, second identifiers of the training image and the feature information; and determine evaluation results of the verification pairs according to the correspondences between the identifiers and the features.

In practical use, the foregoing storage 114 may be volatile memory, for example random-access memory (RAM), or non-volatile memory, for example read-only memory (ROM), flash memory, hard disk drive (HDD) or solid-state drive (SSD); or a combination of the memories of the foregoing kinds. The storage 114 may be configured to provide instructions and data to the processor 113.

In addition, all function modules in some embodiments may be integrated in one processing unit, may also be separate units existed physically, may also be one unit integrated by two or more units. The foregoing units can be realized in hardware, also can be realized by software function modules.

The integrated unit may be stored in a computer readable storage medium if the integrated unit is realized in the form of a software function module and not for sale or use as an independent product. Based on the understanding, the technical solution of the some embodiments may be substantially represented by a software product, or the part contributing to the conventional art or all or part of the technical solution may be represented by the software product. The computer software product is stored in a storage medium, and includes a plurality of instructions for a computer (may be a personal computer, a server, a network device, or the like) or a processor to execute all or part of the operations in the method of some embodiments of the present disclosure. The forgoing storage medium may include the medium that stores program codes, such as a USB flash disk, a portable hard-disk, read only memory (ROM), random access memory (RAM), a magnetic disk, an optical disk, or the like.

The embodiments of the present disclosure provide an evaluating system. The evaluating system is configured to obtain the querying dataset and the training dataset, the querying dataset includes querying images, and the training dataset includes training images. The evaluating system is further configured to generate the verification pairs and the evaluation list according to the querying dataset and the training dataset, and the evaluation list includes the querying images and the training images. Feature information is determined according to the evaluation list. Correspondences between identifiers and features is established according to the first identifiers of the querying images, the second identifiers of the training images, and the feature information. Evaluation results of the verification pairs are determined according to the correspondences between the identifiers and the features. That is, in some embodiments of the present disclosure, the evaluating system may generate the verification pairs and the evaluation list by the obtained querying dataset and the training dataset, and accomplish the evaluating process for the face verification of the verification pairs by using the evaluation list, so as to accomplish the large-scale evaluation for face verification, which reduces a calculation amount, therefore the evaluation efficiency is effectively improved.

The embodiments of the present disclosure provide a computer readable medium with programs stored therein, the foregoing evaluation method for face verification is realized when the program is executed by the processor.

In specific, the program instructions corresponding to the evaluating method for the face verification may be stored in an optical disk, a hard disk, a USB flash disk, or the like. When the program instructions in the storage medium and corresponding to the method are read or executed by an electronic device, the following operations may be executed.

A querying dataset and a training dataset may be obtained, and the querying dataset includes querying images, and the training dataset includes training images.

Verification pairs and an evaluation list may be generated respectively according to the querying dataset and the training dataset; wherein the evaluation list includes the querying images and the training images.

Feature information may be determined based on the evaluation list.

Correspondences between identifiers and features may be established according to first identifiers of the querying images, second identifiers of the training image and the feature information.

evaluation results of the verification pairs may be determined according to the correspondences between the identifiers and the features.

A skilled person in the art should understand, the embodiments of the present disclosure may provide a method, a system, or a computer program product. Therefore, the present disclosure may be implemented in the form of such as hardware embodiments, software embodiments, or embodiments combining software and hardware. Further, the present disclosure may adopt the form of the computer program product executed on one or more computer usable storage media (including but be not limited to a magnetic storage, an optical storage or the like) storing computer usable program codes.

The present disclosure is described according to the schematic views of implementation flowcharts or block diagrams of the method, the device (system), and the computer program product according to some embodiments of the present disclosure. It should be understood that the computer program instructions may implement each flow and/or block in the schematic flowcharts and/or block diagrams, and may implement a combination of the flows and/or the blocks in the schematic flowcharts and/or block diagrams. The computer program instructions may be provided to a universal computer, a special use computer, an embedded processor, or other programmable data-processing device to generate a machine, so that it is possible to generate a device that realize a function designated in realizing one or more flows in the schematic flowcharts and/or one or more blocks in the block diagrams by the instructions executed by the processor of the computer or other programmable data-processing device.

These computer program instructions may also be stored in the computer readable storage that may lead the computer or other programmable data-processing device to work in a certain manner, so as to make the instructions stored in the computer readable storage medium to produce a product including an instruction device. The instruction device realizes functions that are designated in realizing one or more flows of the schematic flowcharts and/or one or more blocks of the block diagrams.

These computer program instructions may also be loaded to the computer or other programmable data-processing device, to make the computer or other programmable device execute a series of operations to produce the processes realized by the computer, so that the instructions executed on the computer or other programmable device may provide functions designated in realizing one or more flows in the schematic flowcharts and/or one or more blocks in the block diagrams. The foregoing are only the preferred embodiments of the present disclosure, not for limiting the protection scope of the present disclosure.

INDUSTRIAL PRACTICABILITY

The embodiments of the present disclosure provide an evaluating method and a system for the face evaluation, and a computer storage medium. The evaluating system is configured to obtain the querying dataset and the training dataset, the querying dataset includes querying images, and the training dataset includes training images. The evaluating system is further configured to generate the verification pairs and the evaluation list according to the querying dataset and the training dataset, and the evaluation list includes the querying images and the training images. Feature information is determined according to the evaluation list. Correspondences between identifiers and features is established according to the first identifiers of the querying images, the second identifiers of the training images, and the feature information. Evaluation results of the verification pairs are determined according to the correspondences between the identifiers and the features. That is, in some embodiments of the present disclosure, the evaluating system may generate the verification pairs and the evaluation list by the obtained querying dataset and the training dataset, and accomplish the evaluating process for the face verification of the verification pairs by using the evaluation list, so as to accomplish the large-scale evaluation for face verification, which reduces a calculation amount, therefore the evaluation efficiency is effectively improved.

What is claimed is:

1. An evaluating method for face verification, comprising:
obtaining a querying dataset and a training dataset, wherein the querying dataset comprises querying images, and the training dataset comprises training images, wherein the querying images are images pre-stored in a database;
generating verification pairs and an evaluation list respectively according to the querying dataset and the training dataset; wherein the evaluation list comprises the querying images and the training images, each of the verification pairs comprises a querying image and at least one training image, and the querying image and the at least one training image belong to images of a same person;
determining feature information based on the evaluation list;
establishing correspondences between identifiers and features according to first identifiers of the querying images, second identifiers of the training image, and the feature information; and
determining evaluation results of the verification pairs according to the correspondences between the identifiers and the features;
wherein the evaluation results are configured to determine an accuracy of the face verification.

2. The method as claimed in claim 1, wherein the method, after the obtaining the querying dataset and the training dataset, further comprises:
extracting the querying images of the querying dataset; and
performing a labeling process for the querying images in sequence to generate the first identifiers, wherein each of the querying images corresponds to a corresponding one of the first identifiers.

3. The method as claimed in claim 1, wherein the method, after the obtaining the querying dataset and the training dataset, further comprises:
extracting the training images of the training dataset; and
performing a labeling process for the training images to generate the second identifiers, wherein each of the training images corresponds to a corresponding one of the second identifiers.

4. The method as claimed in claim 1, wherein the generating the verification pairs and the evaluation list respectively according to the querying dataset and the training dataset, comprises:
pairing each of the querying image of the querying dataset with at least one of the training images of the training dataset, to generate a verification pair.

5. The method as claimed in claim 4, wherein a first querying image and a first training image that constitute a first verification pair are not totally same to a second querying image and a second training image that constitute a second verification pair.

6. The method as claimed in claim 1, wherein the generating the verification pairs and the evaluation list respectively according to the querying dataset and the training dataset, comprises:
constituting the evaluation list according to all of the querying images of the querying dataset and all of the training images of the training dataset.

7. The method as claimed in claim 6, wherein any two images in the evaluation list are different from each other.

8. The method as claimed in claim 3, wherein the determining the feature information based on the evaluation list, comprises:
performing a detecting process for the evaluation list, to obtain facial feature maps corresponding to the evaluation list; and
performing a feature-identifying process for the facial feature maps, to obtain feature information corresponding to the facial feature maps.

9. The method as claimed in claim 8, wherein the performing the detecting process for the evaluation list to obtain the facial feature maps corresponding to the evaluation list, comprises:
inputting all images in the evaluation list into a preset face detection model in sequence, and outputting the facial feature maps; wherein each of the images corresponds to a corresponding one of the facial feature maps.

10. The method as claimed in claim 9, wherein the performing the feature-identifying process for the facial feature maps to obtain the feature information corresponding to the facial feature maps, comprises:
inputting the facial feature maps to a preset feature recognition model, and outputting the feature information; wherein each of the facial feature maps corresponds to a corresponding group of feature information.

11. The method as claimed in claim 10, wherein the establishing the correspondences between the identifiers and the features according to the first identifiers of the querying images, the second identifiers of the training image, and the feature information, comprises:
establishing correspondences between the identifiers and the feature maps based on the first identifiers, the second identifiers, and the facial feature maps; and
establishing the correspondences between the identifiers and the features according to the correspondences between the identifiers and the feature maps, and the feature information.

12. The method as claimed in claim 1, wherein the determining the evaluation results of the verification pairs according to the correspondences between the identifiers and the features, comprises:
performing a face verifying process for the verification pairs according to the correspondences between the identifiers and the features, to generate face-verification results; and
performing an evaluating process for the face-verification results, to obtain the evaluation results.

13. The method as claimed in claim 12, wherein the performing the face verifying process for the verification pairs according to the correspondences between the identifiers and the features to generate the face-verification results, comprises:
determining a first target identifier and a second target identifier corresponding to a verification pair;
determining first feature information according to the first target identifier and the correspondences between the identifiers and the features;
determining second feature information according to the second target identifier and the correspondences between the identifiers and the features;
generating a face-verification result based on the first feature information and the second feature information.

14. The method as claimed in claim 13, wherein the generating the face-verification result based on the first feature information and the second feature information comprises:
- in response to the first feature information being same to the second feature information, determining the face-verification result being pass; and
- in response to the first feature information being different from the second feature information, determining the face-verification result being failure.

15. The method as claimed in claim 13, wherein the generating the face-verification result based on the first feature information and the second feature information, comprises:
- calculating a similarity between the first feature information and the second feature information;
- in response to the similarity being larger than or equal to a preset similarity threshold, determining the face-verification result being pass; and
- in response to the similarity being less than the preset similarity threshold, determining the face-verification result being failure.

16. The method as claimed in claim 12, wherein the performing the evaluating process for the face-verification results to obtain the evaluation results, comprises:
- obtaining an original verification result corresponding to a verification pair; and
- performing the evaluating process for a face-verification result of the verification pair according to the original verification result thereof, to obtain an evaluation result thereof.

17. The method as claimed in claim 1, further comprising:
- determining memory parameters;
- processing the verification pairs in batches according to the memory parameters, to obtain at least one batch of the verification pairs; and
- storing the at least one batch of the verification pairs in sequence.

18. The method as claimed in claim 1, wherein the obtaining the querying dataset and the training dataset, comprises:
- obtaining a plurality of images by an infrared camera, wherein the images are all gray-scale images; and
- determining the query dataset and the training dataset according to the images.

19. An evaluating system, comprising:
- a processor and a storage that stores instructions executable by the processor, wherein when the instructions are executed by the processor, the processor performs an evaluating method for face verification, and the method comprises:
  - obtaining a querying dataset and a training dataset, wherein the querying dataset comprises querying images, and the training dataset comprises training images, wherein the querying images are images pre-stored in a database;
  - generating verification pairs and an evaluation list respectively according to the querying dataset and the training dataset; wherein the evaluation list comprises the querying images and the training images, each of the verification pairs comprises a querying image and at least one training image, and the querying image and the at least one training image belong to images of a same person;
  - determining feature information based on the evaluation list;
  - establishing correspondences between identifiers and features according to first identifiers of the querying images, second identifiers of the training image, and the feature information; and
  - determining evaluation results of the verification pairs according to the correspondences between the identifiers and the features;
  - wherein the evaluation results are configured to determine an accuracy of the face verification.

20. A non-transitory computer storage medium, having programs stored therein, applied in an evaluating system, wherein the programs are executed by a processor, to perform an evaluating method for face verification, and the method comprises:
- obtaining a querying dataset and a training dataset, wherein the querying dataset comprises querying images, and the training dataset comprises training images, wherein the querying images are images pre-stored in a database;
- generating verification pairs and an evaluation list respectively according to the querying dataset and the training dataset; wherein the evaluation list comprises the querying images and the training images, each of the verification pairs comprises a querying image and at least one training image, and the querying image and the at least one training image belong to images of a same person;
- determining feature information based on the evaluation list;
- establishing correspondences between identifiers and features according to first identifiers of the querying images, second identifiers of the training image, and the feature information; and
- determining evaluation results of the verification pairs according to the correspondences between the identifiers and the features;
- wherein the evaluation results are configured to determine an accuracy of the face verification.

* * * * *